United States Patent [19]

Harris et al.

[11] Patent Number: 6,014,635
[45] Date of Patent: Jan. 11, 2000

[54] SYSTEM AND METHOD FOR PROVIDING A DISCOUNT CREDIT TRANSACTION NETWORK

[75] Inventors: Jeffrey Harris, Boca Raton, Fla.; Douglas Kirschner, Chicago, Ill.; James Purdy, Boca Raton, Fla.

[73] Assignee: SHC Direct, Inc., Hillside, Ill.

[21] Appl. No.: 08/986,877

[22] Filed: Dec. 8, 1997

[51] Int. Cl.[7] .............................. G06F 17/60; G06F 7/00; G06F 15/30

[52] U.S. Cl. ................................. 705/14; 705/39; 705/44

[58] Field of Search .................................. 705/14, 39, 44

[56] References Cited

U.S. PATENT DOCUMENTS

| Re. 32,985 | 7/1989 | Nagata et al. | 705/41 |
|---|---|---|---|
| 4,485,300 | 11/1984 | Peirce | 235/380 |
| 4,700,055 | 10/1987 | Kashkashian, Jr. | 235/379 |
| 4,734,564 | 3/1988 | Boston et al. | 235/380 |
| 4,906,826 | 3/1990 | Spencer | 235/379 |
| 4,943,707 | 7/1990 | Boggan | 235/380 |
| 5,010,485 | 4/1991 | Bigari | 705/17 |
| 5,025,372 | 6/1991 | Burton et al. | 364/406 |
| 5,056,019 | 10/1991 | Schultz et al. | 705/14 |
| 5,175,682 | 12/1992 | Higashiyama et al. | 364/408 |
| 5,177,342 | 1/1993 | Adams | 235/379 |
| 5,231,569 | 7/1993 | Myatt et al. | 364/408 |
| 5,231,570 | 7/1993 | Lee | 364/408 |
| 5,287,268 | 2/1994 | McCarthy | 705/14 |
| 5,365,046 | 11/1994 | Haymann | 235/380 |
| 5,466,919 | 11/1995 | Hovakimian | 235/380 |
| 5,467,269 | 11/1995 | Flaten | 705/14 |
| 5,477,040 | 12/1995 | Lalonde | 235/380 |
| 5,479,510 | 12/1995 | Olson et al. | 380/24 |

(List continued on next page.)

OTHER PUBLICATIONS

Credit Card Management, "Anything But Retired . . .", v7, n7 p 10–14, Oct. 1994.

Cards International, "United States: New GE Card Take on Amex", n129, p. 1, Mar. 1995.

Card News, "New Players Changing the Face of Card Industry", v6, n1, Jan. 1991.

Business Wire, "Transmedia Europe and Transmedia Asia Pacific Sign Definitive Cooperation Agreement with Countdown Holdings", Aug. 27, 1996.

Linnen, Beth M., "Dressing Up the Store Card", Credit Card Management, v8, n12, p 40–46, Mar. 1996.

PR Newswire, "America Online Awards $1 Million to AOL Member Hundreds Are Winners in 'What is it∓' Million Dollar Sweepstakes", Aug. 13, 1996.

(List continued on next page.)

Primary Examiner—Allen R. MacDonald
Assistant Examiner—James W. Myhre
Attorney, Agent, or Firm—Bryan Cave LLP

[57] ABSTRACT

A system and method for providing a discount for a credit-based transaction. The system includes a discount credit network wherein a participant holding a transaction card account issued by a card issuer is assigned a membership number that is associated with the participant's transaction card account. The preferred discount credit system also includes a discount authorization processor that is operatively connected to the discount credit network having a database containing the membership numbers and their associated transaction card accounts and processing means for correlating the membership numbers to such associated transaction card accounts. The preferred discount authorization processor is operatively connected to receive discount authorization requests from authorized merchants, correlate such requests to an associated transaction card account and transaction card issuer, and issue a transaction request to that particular transaction card issuer. The discount authorization processor receives an authorization response signal from the transaction card issuer and forwards such authorization response signal to the merchant who then applies the discount to the transaction whereby the participant receives a discount for initiating the transaction through the discount credit network.

18 Claims, 7 Drawing Sheets

U.S. PATENT DOCUMENTS

| | | | |
|---|---|---|---|
| 5,485,510 | 1/1996 | Colbert | 379/145 |
| 5,537,314 | 7/1996 | Kanter | 705/14 |
| 5,590,197 | 12/1996 | Chen et al. | 380/24 |
| 5,591,949 | 1/1997 | Bernstein | 235/380 |
| 5,678,010 | 10/1997 | Pittenger et al. | 705/44 |
| 5,774,870 | 6/1998 | Storey | 705/14 |
| 5,806,045 | 9/1998 | Biorge et al. | 705/14 |

OTHER PUBLICATIONS

PR Newswire, "America Online Announces Launch of New Product, New Pricing and Member Benefit Programs; . . .", Jul. 1, 1996.

PR Newswire, "Transmedia Network, Inc. Announces Third Fiscal Quarter Results", Jul. 25, 1996.

PR Newswire, "Fifth Third Bank, Kroger Expand Kroger Mastercard; Frequent Shopper Rebate Program Now Availabel in 10 States", Jun. 24, 1996.

PR Newswire, "ITT Sheraton and American Express Launch Co–Branded Credit Card", Jun. 14, 1996.

PR Newswire, "New VISA Card to Promote North Carolina Agricultural Products", Jun. 21, 1996.

SYSTEM AND METHOD FOR PROVIDING A DISCOUNT CREDIT TRANSACTION NETWORK

FIELD OF THE INVENTION

The present invention relates generally to methods for providing a credit transaction system and, more particularly, to methods for providing a discount to customers using such credit transaction systems.

BACKGROUND OF THE INVENTION

The use of transaction cards (including debit or ATM cards) for payment of merchandise is ever increasing. When purchasing merchandise using a standard transaction (i.e., credit) card, the purchaser will typically provide the merchant with the card bearing the account number (or the card number and expiration date if the purchase is being made over a telephone or computer network), and the merchant will then seek authorization from the issuer of the credit card to verify that payment will be forthcoming. The request for authorization is conventionally made over high-speed telecommunication links using modern computer data processors. Thus, the merchant will normally receive an authorization response in "real-time." Credit cards and, particularly, credit card account numbers are somewhat standardized, thus allowing a merchant to accept credit cards from a number of credit card companies, such as companies providing credit card services under the marks VISA®, MASTERCARD® and DISCOVER®, and others, while being connected to a single credit authorization system. The account number of such cards contains information that identifies the sponsor and the particular issuer of the card, such as a local or national bank. This information is necessary to route any authorization request to the appropriate card-issuer using the credit authorization system.

One standard computer network for transmitting authorization requests is the VISA® credit transaction network. In addition to VISA® credit cards, merchants connected to this network may seek authorization for approval of transactions involving other credit cards, such as MASTERCARD® and DISCOVER® credit cards. The VISA® credit transaction network includes a plurality of data processors and financial institutions, all interconnected through telecommunication links which, based on a six digit bank identification number (BIN), route all authorization requests to the appropriate card-issuer and all authorization responses back to the requesting merchant.

Competing transaction card issuers are increasingly seeking ways to cultivate and increase the loyalty to, and the use of, their particular cards. Recently, card issuers have begun developing business relationships with merchants, vendors, organizations and others to add value and provide benefits for the holders of such cards. For example, many card issuers have developed affinity programs wherein the holder of a transaction card receives a benefit each time the card is used to pay for merchandise. The benefit may be in the form of a discount off the price of the merchandise, a rebate, frequent flyer mileage points, or reward points which may eventually be redeemed for cash or gifts. Additionally, known affinity programs may provide a cardholder with a membership number which is linked to one or more of the cardholder's credit, debit or ATM cards. The cardholder purchases merchandise using the membership number and, eventually, a debit is recorded against the associated credit, debit or ATM card. Typically, the administrator of the affinity program develops and operates a private computer-based network to allow the merchants to authorize the transaction.

If such affinity programs were able to take advantage of the previously-described existing credit authorization systems, such as the conventional VISA® credit transaction network, the costs associated with developing and maintaining such affinity programs would be greatly reduced. By using an existing credit authorization system, there would be no need to build a private transaction network, and the participating card issuers, merchants, and customers would have immediate access to established security, authorization, and settlement processes.

Therefore, there exists a need for an improved discount credit network which utilizes an existing credit authorization system, such as the conventional VISA® transaction network.

SUMMARY OF THE INVENTION

In accordance with the principles of the invention, the present invention provides a system and method for providing a discount for a credit-based transaction. The system includes a discount credit network wherein a participant holding a transaction card account issued by a card issuer is assigned a membership number that is associated with one of the participant's transaction card accounts. Preferably, each membership number comprises a bank identification number assigned by a VISA® credit card system, thereby allowing the membership number to access and be processed by a VISA® credit transaction network.

The system further includes authorized merchants capable of accepting requests for merchandise or services from a participant and generating discount authorization requests that includes the participant's membership number and an amount for the charge transaction. The preferred discount credit system also preferably includes a discount authorization processor that is operatively connected to the discount credit network. Preferably, the discount authorization processor provides a database containing the membership numbers and their associated transaction card accounts and processing means for correlating the membership numbers to such associated transaction card accounts. The preferred discount authorization processor is operatively connected to receive the discount authorization requests and includes: (i) logic means for correlating the membership number to its associated transaction card account; (ii) means for generating a transaction request to one of a plurality of transaction card issuers, the transaction request comprising the particular participant's transaction card account and the amount of the transaction; (iii) means for receiving an authorization response signal from the transaction card issuer; and (iv) means for applying the discount to the transaction whereby the participant receives a discount for initiating the transaction through the discount credit network.

In order to receive the benefits of the present invention, a participant provides a membership number to an authorized merchant for a transaction. The merchant then issues a discount authorization request to a merchant bank wherein the discount authorization request includes transaction data comprising the particular participant's membership number and an amount for the transaction. The discount authorization request is then routed through the discount credit network from the merchant bank to the discount authorization processor, which then correlates the membership number to its appropriate transaction card account, and transmits a transaction authorization request to the appropriate transaction card issuer associated with the transaction card account through the credit network. The request is processed by the transaction card issuer who then transmits an authorization response signal indicating an approval or denial of the proposed transaction. The response signal is received by the discount authorization processor and forwarded to the initial authorized merchant. By using the preferred discount credit system, the participant receives a discount off the selected merchandise or services.

Preferably, during the settlement process of the present invention, both a debit transaction for 100% of the purchase price and a credit transaction for the discount savings are recorded on the participant's transaction card account statement. The settlement process may preferably occur either as a direct on-line process or in batch mode.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF THE INVENTION

Figure 1:
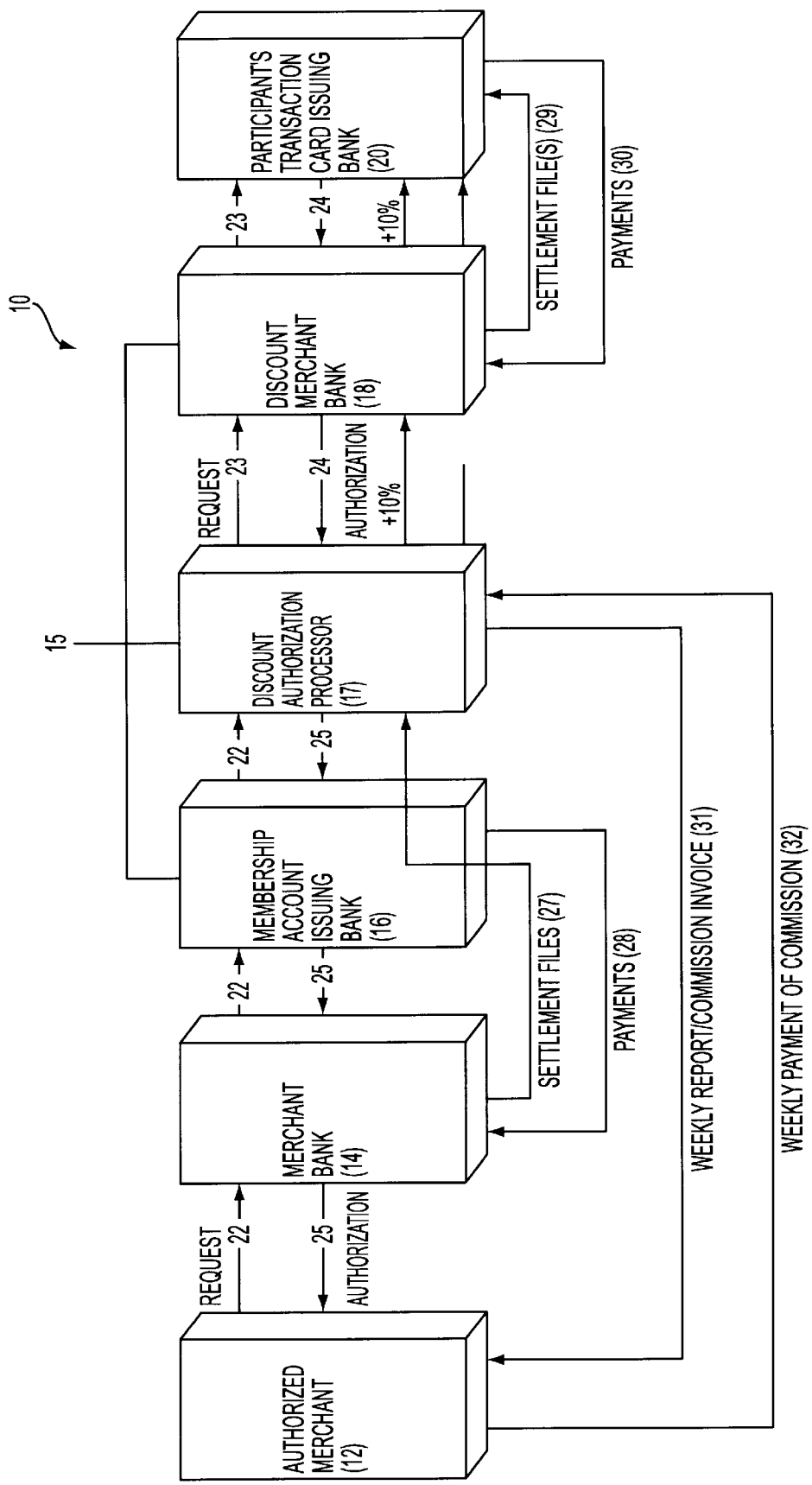
FIG. 1 is a block diagram showing the major elements of the presently preferred discount credit system.

The presently preferred method of the present invention provides a discount credit system which permits participants to obtain goods and services at a discount from participating authorized merchants, such as national catalog merchants. The invention provides methods to enroll participants in the discount credit system, methods to facilitate transactions using the system, and methods to settle all transactions processed through the discount credit system.

Preferably, the system is administered by a discount credit system administrator who contracts to operate the program with a number of organizations (referred to as clients) having members holding transaction card accounts, such as, for example, companies providing credit card services under the marks VISA®, MASTERCARD®, or DINER'S CLUB®. Clients may preferably include transaction card issuing financial institutions, trade associations, cable/entertainment companies, cellular service companies, and the like. Preferably, the clients will offer enrollment in the discount credit system to their members whose accounts are in good standing. Enrollment in the system is linked to one of the participant's transaction card accounts and, thus, all purchases made by the participant through the discount credit system are debited against that particular transaction card account.

The system administrator is also preferably responsible for contracting with participating vendors, who become authorized merchants and agree to offer their goods or services to the participants of the discount credit system at a reduced rate, provided that such participants directly contact the authorized merchants and provide their assigned membership number, in lieu of other payment methods, at the time of purchase from the authorized merchant.

Typically, when a participant obtains goods or services from an authorized merchant, using the method of the discount system as described herein, the participant will receive a percentage discount off the list price of such goods or services. Preferably, the discount credit system administrator will pay the client a commission based on the aggregate amount of purchases made by the client's members under the program.

The present invention provides for two methods whereby a participant may establish an account with the discount credit system. Preferably, the present invention provides for passive enrollment of customers, whereby the client will (possibly in association with the discount credit system administrator) create a database file containing biographical information about each member (i.e., potential customer), such as the member's name, address, and phone number. The database preferably will contain a unique identifying membership number, such as an account number, a telephone number (including the area code), or any other unique number, associated with each member. Preferably, the membership number uses a sixteen digit conventional VISA® debit card number, thus permitting the membership number to access and be processed through the conventional VISA® credit transaction network. Although the description of a preferred embodiment of the present invention describes the use of a conventional VISA® credit transaction network, other similar credit transaction networks may be used and are considered to be within the scope of the invention. Following the conventional VISA® credit transaction network standard, the first six digits of the membership number represent a bank identification number (BIN), which has preferably been assigned to the administrator of the discount credit system. Thus, all transactions processed through the discount credit system which use a membership number will be routed through a particular processor associated with the discount credit system administrator. Preferably, the membership number is associated with one of the customer's transaction cards, which then acts as the payment vehicle. The client will then provide each of its pre-registered members with their assigned membership numbers, along with information related to the discount credit system and instructions for using such system.

Alternatively, the present invention provides a method whereby potential members may actively enroll in the discount credit system. In order to allow its members to actively enroll themselves as authorized participants of the discount credit system, a client will preferably prepare a database file containing biographical information about each member (i.e., potential customer), such as the member's name, address, and phone number. The database preferably will, similar to the passive enrollment embodiment, contain a unique identifying membership number associated with each potential member. Using this active enrollment process, rather than pre-enrolling each member as a participant of the discount credit network, the client, possibly with the assistance of the discount credit system administrator, will contact each of its members, describe the benefits of the discount credit system and provide them with means to enroll in the system. Such contact may preferably be made by telephone solicitation, direct mail pieces (for example, an enrollment brochure enclosed with a monthly statement), or any other appropriate method. The contact piece will preferably include instructions for the member to contact the client (or the discount credit system administrator) to arrange for enrollment, such as, for example, by contacting an automated enrollment process via a 1-800 telephone number. The automated enrollment process preferably allows the member to enter one of their transaction card account numbers, and its expiration date, and receive their uniquely assigned membership number. Once actively enrolled as a customer in the discount credit system, the customer may begin contacting authorized merchants, place orders for goods and/or services, and receive the established discounts off such goods and/or services. Based on the information gathered during the enrollment process, the discount credit system administrator will preferably populate a database having information about each participant. Such information preferably includes personal identifying information about the participant, such as his/her name, address, and phone number, the participant's membership number, and the participant's selected transaction card account number.

Preferably, at the time an order is placed, the participant identifies him/herself as an authorized discount system member and provides the merchant with his/her membership number. The transaction is then preferably processed through the discount credit network, including the use of a conventional VISA® credit transaction system. Using the discount credit system, the authorized merchant secures a "real time" authorization from the discount credit network for 100% of the purchase price (i.e., before any discount is applied). The use of the conventional VISA® credit transaction network assists in ensuring security of the membership numbers and provides a convenient mechanism for debit, credit, and settlement transactions to be processed among the financial institutions, merchants and processors associated with the discount credit system.

As shown in FIG. 1, the discount transaction system 10 of the present invention preferably includes several data processors interconnected through a conventional VISA® transaction network. As is known, a VISA® transaction network provides a method for merchants to receive real-time authorization for credit-based transactions, wherein such authorization typically is generated by a customer's transaction card-issuing bank. The discount credit system 10 preferably includes a number of authorized merchants 12, who agree to participate in the program and are connected via established telecommunication links to a conventional VISA® credit transaction network. The discount credit system 10 further preferably includes a number of merchant banks 14. Preferably each authorized merchant 12 is connected to one of the merchant banks 14, which provides a gateway for the authorized merchant 12 into the VISA® credit network. The authorized merchant 12 issues requests for credit authorization to its associated merchant bank 14 and receives associated authorization response signals from the merchant bank 14, which indicate acceptance or declination of the proposed credit transaction. For purposes of the present invention, the authorized merchants 12 issue credit requests in the similar fashion for their customers using the discount credit network as for those customers purchasing goods or services using a conventional transaction card. Thus, the impacts on the merchant 12 and the participants of the discount credit system 10 are minimal. The authorized merchants 12 accept the participant's membership number in the same manner as accepting a conventional credit card account number—both contain sixteen digits wherein the first six digits represent a unique bank identification number (BIN) that is used by the conventional VISA® transaction network to route the authorization request to a particular transaction card-issuing bank.

The discount credit system 10 also preferably includes a series of discount transaction processors 15, which include: (i) a membership account issuing bank 16; (ii) a discount authorization processor 17; and (iii) a discount merchant bank 18. The membership account issuing bank 16 preferably establishes accounts associated with each membership number for each participant. The discount authorization processor 17 holds a database of information related to each participant and each transaction processed through the discount credit system 10, and further, preferably contains logic necessary to correlate a participant's membership number to his/her associated transaction card account. The discount merchant bank 18 acts as a conventional transaction card merchant bank—it is designed to accept conventional credit authorization requests from its associated merchants or vendors (which, for purposes of the present invention means the discount authorization processor 17), forward such requests to the bank which issued the particular transaction card, receive a response from such issuing bank, and provide the response to the associated merchant or vendor (i.e., the discount authorization processor 17).

The collection of discount transaction processors 15 are preferably interconnected through a conventional high-speed telecommunication link and connected to the conventional VISA® transaction network, which therefore includes the authorized merchants 12 and their associated merchant banks 14. A participants transaction card issuing bank 20 is connected to the discount merchant bank 18 to receive transaction requests and issue conventional authorization responses. A dedicated telecommunication link is preferably established between the discount authorization processor 17, the discount merchant bank 18, and the participants transaction card issuing bank 20 in order to alleviate "time-out" issues which arise in certain prior art transaction networks.

Upon each order placed by a participant, two sets of signals pass through the discount credit system on the conventional VISA® transaction network. The request signals 22 and 23 represent the authorization requests initiated by the authorized merchant 12 and the discount authorization processor 17. The authorization signals 24 and 25 represent the authorization signals eventually returned to the requesting authorized merchant 12.

In a preferred embodiment of the present invention, in order to obtain the benefits of the discount credit network, a participant contacts an authorized merchant 12 to purchase a selected item. Preferably, the participant provides the authorized merchant with his/her membership number and the authorized merchant 12 processes the transaction as a conventional VISAS transaction through the authorized merchant's 12 associated merchant bank 14. As is known, the authorized merchant 12 provides the merchant bank 14 with certain information related to the proposed credit transaction, including the amount of the transaction and the membership number (in lieu of a conventional transaction card account number).

Based upon the unique bank identification number (BIN) embodied within the membership number, the first authorization request 22 is then transferred by the merchant bank 14 through the discount credit system 10 to the membership account issuing bank 16. The membership account issuing bank 16 recognizes that the first authorization request 22 is related to the discount credit network and preferably routes the first authorization request 22 through an open/dedicated communication line to the discount authorization processor 17. The discount authorization processor 17 receives the authorization request, which includes the membership account number, verifies that the request originated from an authorized merchant 12, correlates the participant's membership number to their associated personal transaction card account number as stored in the database, and initiates a second authorization request 23 to the discount merchant bank 18. Preferably, this second authorization request 23 includes a transaction account number associated with the participant's membership number and the value of the proposed credit transaction.

Preferably, the second authorization request 23 is forwarded by the discount authorization processor 17 to the discount merchant bank 18. The discount merchant bank 18 then requests, through the conventional VISA® transaction network, an authorization on the participant's personal transaction card, which is associated with the participant's membership number, from the participant's transaction card issuing bank 20 for the gross transaction amount. The participants transaction card issuing bank 20, following conventional procedures, determines if the proposed credit transaction is allowable (i.e., the participant's credit account is in good standing and the participant is permitted to charge the value of the proposed transaction against his/her transaction card account), and responds to the request by issuing a first authorization signal 24, which is transmitted through the conventional VISA® credit transaction network to the discount merchant bank 18. The first authorization signal 24 indicates whether the proposed transaction is permissible and, preferably, includes information identifying the transaction and the originating authorized merchant 12. Alternatively, the first authorization signal 24 may indicate that the participant's transaction card bank 20 has declined to authorize the proposed credit transaction.

Upon receipt of the first authorization signal 24 for the transaction, the discount merchant bank 18 transfers the authorization information through the discount credit system 10 to retrace the original communication path back to the original requesting merchant 12. Thus, the first authorization signal 24 is transferred to the discount authorization processor 17, which correlates the transaction card account number associated with the first authorization signal 24 to its associated membership number and issues a second authorization signal 25, which is analogous to the first authorization signal 24, except that it is associated with the membership number and, thus, may be recognized by the upstream processing elements. This second authorization signal 25 is transferred through the membership account issuing bank 16, to the merchant bank 14, and then to the authorized merchant 12. Upon receipt of the authorization signal, the merchant processes the participant's order, which may include declining the order if the authorization signals 24 and 25 indicate that the participant's transaction card issuing bank refused to grant a credit approval. Preferably, the discount authorization processor 17 records all information related to each transaction, including the membership number, the merchant, and the response from the participant's transaction card-issuing bank, for use in later settlement processes and for use in self-approving later transactions.

Preferably, the present invention provides the capability to self-authorize transactions when a timely response is not received from the participant's transaction card-issuing bank 20. When the discount authorization processor 17 does not receive, after a selected period of waiting time, a response to an issued second authorization request 23, the system may enter into a self-authorization mode. Preferably, the discount authorization processor 17 includes database means provided with authorization parameters. These authorization parameters preferably include a transaction limit amount whereby only transactions falling below the limit will be self-authorized, and a database of historical transaction information related to each discount account number. Based upon the particular participant, the discount authorization processor 17 will examine the historical information contained in the database and preferably generate an appropriate authorization response signal.

The system of the present invention further provides a system and method to settle all transactions processed through the discount credit system 10. Preferably, during the settlement process of the present invention, both a debit transaction for 100% of the purchase price and a credit transaction for the discount savings are recorded on the participant's transaction card account statement. The settlement process may preferably occur either as a direct on-line process or in batch mode.

Within the discount credit network, two settlement transactions preferably occur for each purchase processed through the system 10. The first involves the transaction between the authorized merchant 12 and the membership account issuing bank 16. The second transaction involves the transaction between the discount merchant bank 18 and the participant's transaction card issuing bank 20.

The authorized merchant 12 receives payment on any transaction processed using the preferred discount credit system 10 through the conventional VISA® credit transaction network settlement procedures. The authorized merchant 12 issues a settlement request, which preferably includes a group of settlement files 27, through its associated merchant bank 14, which is then transferred to the membership account issuing bank 16. The membership account issuing bank recognizes and processes the settlement request. Payments 28, representing the gross amount of purchases made using the discount credit system 10, are preferably withdrawn from an umbrella account, which is housed at the membership account issuing bank 16 and paid to the merchant bank 14.

The second settlement process involves the discount merchant bank 18 and the participant's transaction card issuing bank 20. Preferably, the discount merchant bank 18 will transmit settlement files 29 through the conventional VISA® credit network to each of the participant's transaction card issuing banks 20, who preferably will process each such files 29 and forward payments 30 back to the discount merchant bank 18.

Preferably, on a periodic basis, the discount authorization processor 17 will forward a weekly report and commission invoice 31 to each participating authorized merchant 12 for the commission due on all approved transactions using the discount credit network.

Preferably, each authorized merchant will provide the payment of commissions 32 to the discount authorization processor 17. Preferably, the commission is based on a conventional formula, such as, for example, an agreed to percentage of gross sales less returns.

Preferably, periodically, a consolidated statement of the transactions utilizing a particular membership number during the period is generated and sent to each corresponding participant. Preferably, the statement is the conventional credit card monthly statement and shows the original amount for the merchandise or services as debit along with discount applied to each such transaction as a credit.

Referring now to FIGS. 2 through 7, therein is illustrated a representative flow diagram of a preferred embodiment of the discount credit method of the present invention. The following describes the process flow associated with FIGS. 2 through 7 inclusive.

Figure 2:
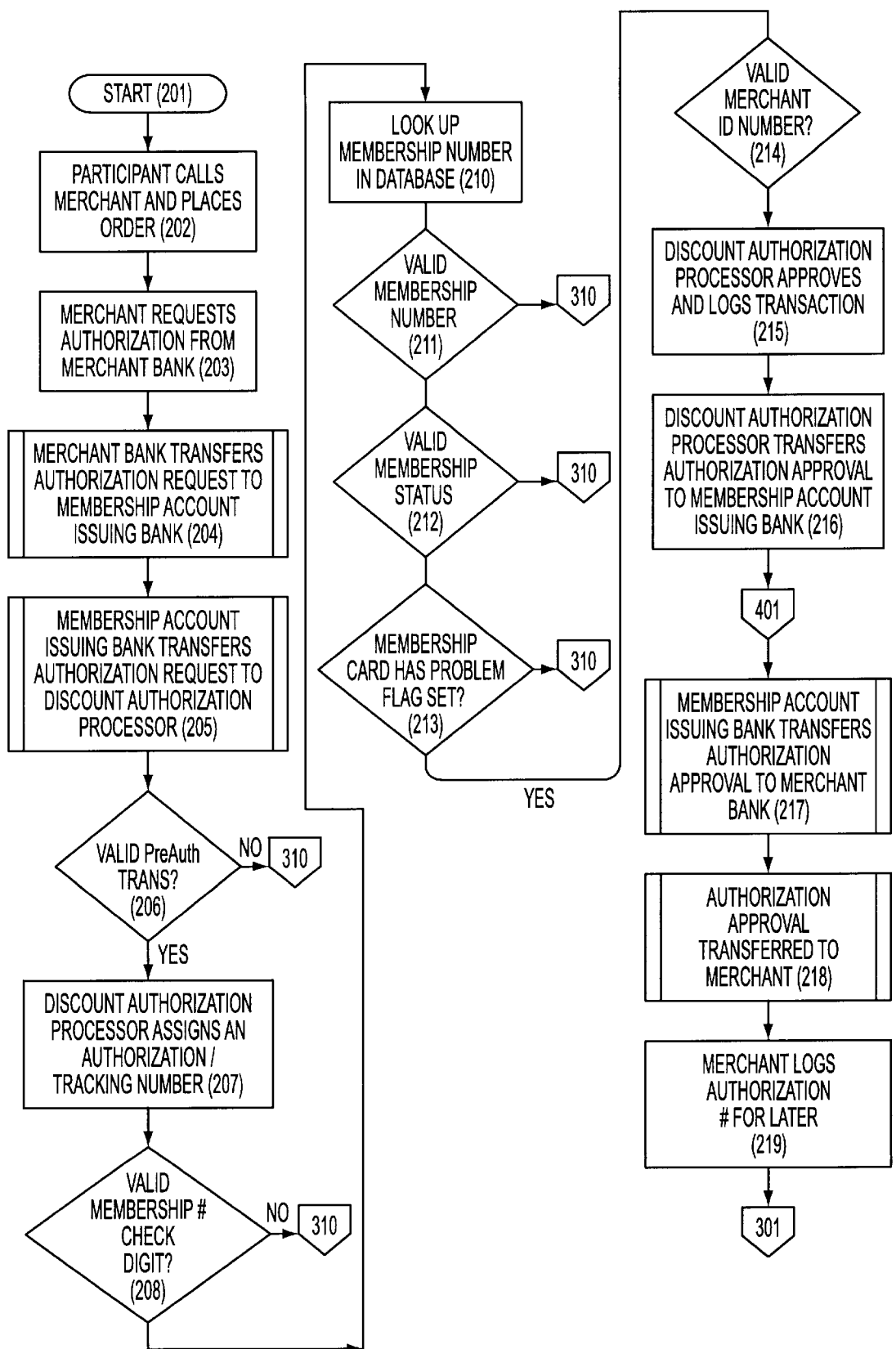
FIGS. 2 through 5 show a representative process for processing a transaction request issued in accordance with the presently preferred method of the present invention.
Figure 3:
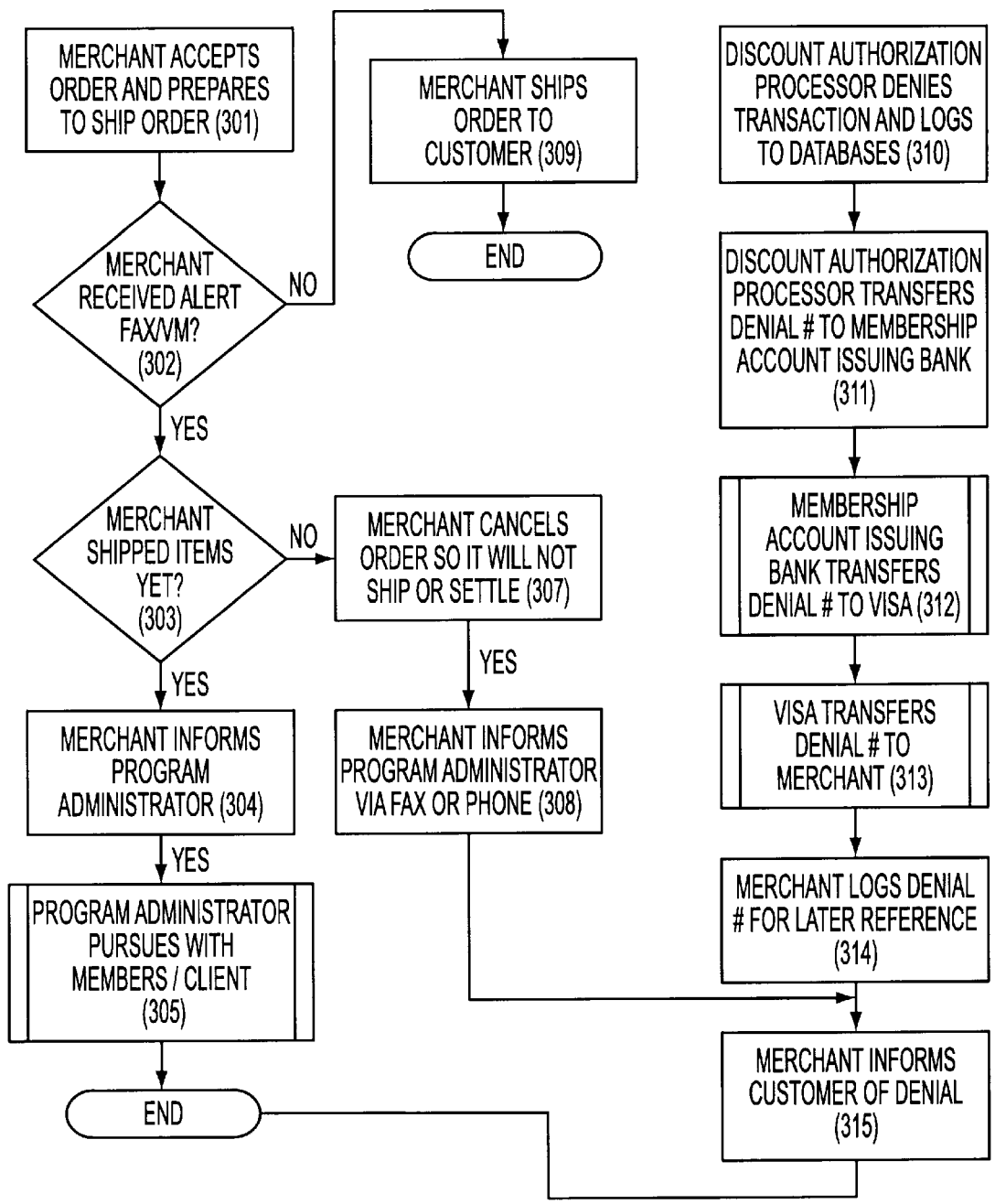
Figure 4:
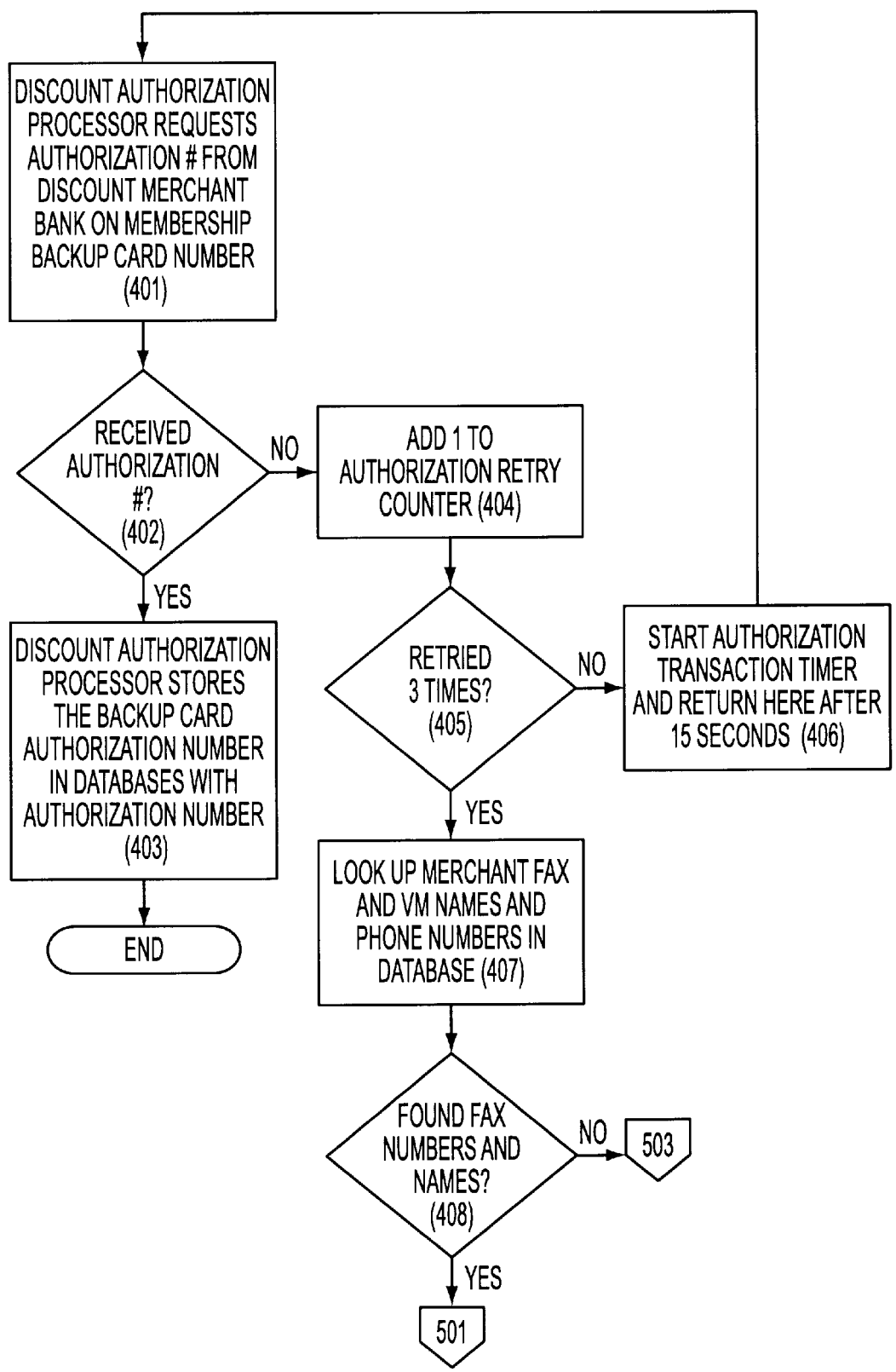
Figure 5:
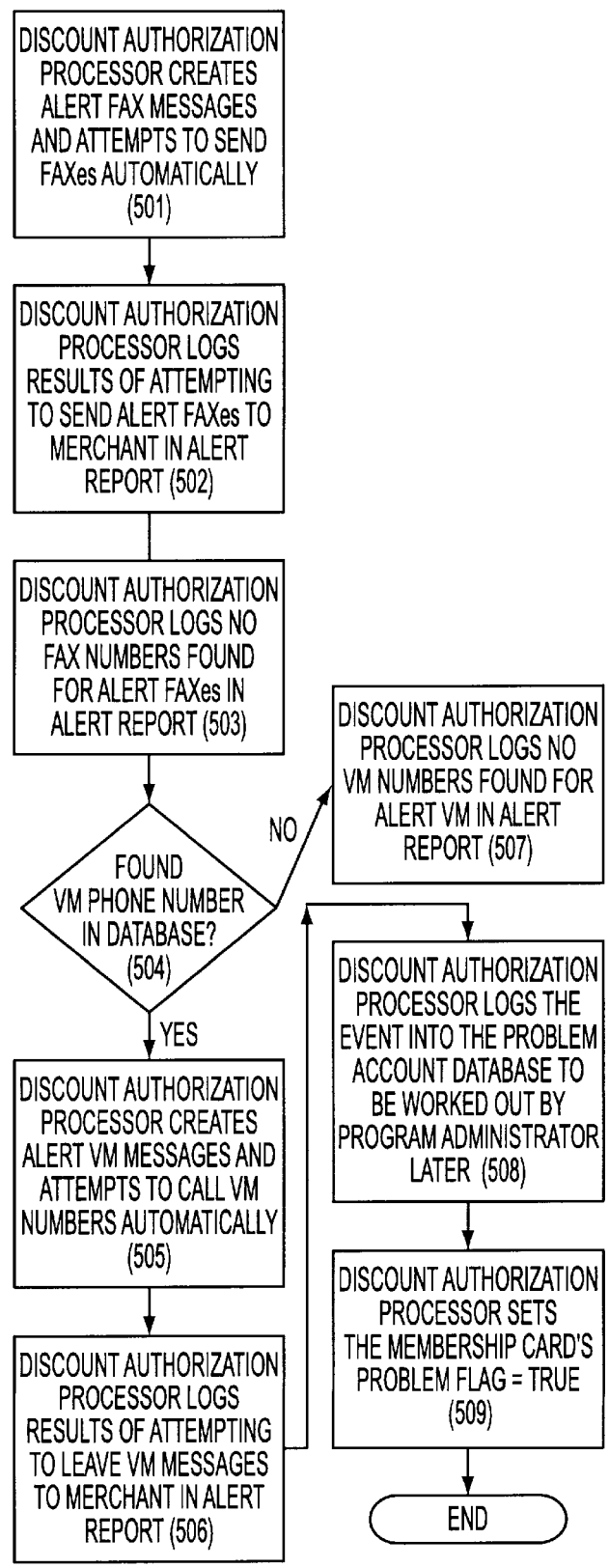

The process initiates at step 201 in FIG. 2. In step 202, a participant telephonically contacts a participating authorized merchant 12, and notifies the merchant 12 that he or she desires to place an order utilizing the benefits of the discount transaction system 10 and provides the merchant 12 with his/her membership number and the identify of the desired merchandise. In step 203, the merchant 12 initiates a first discount authorization request 22 to the merchant bank 14 that preferably includes certain information regarding the proposed transaction including, for example, the identify of the merchant 12, the requesting participant's membership number and the amount of the transaction.

In steps 204 and 205, this first discount authorization request 22 is routed through the discount transaction network 10 from the merchant bank 14 to the discount transaction processors 15. In this preferred embodiment, the discount transaction processors comprises three separate entities, namely, (i) membership account issuing bank 16, i.e., the card issuer that issued the discount membership numbers; (ii) a discount authorization processor 17, such as, for example, WELCOME AMERICA™ authorization processor and (iii) a discount merchant bank 18. In step 206, the system may preferably determine if a valid pre-authorized transfer is in process and, if not, the process flows to step 310 (on FIG. 3) to deny the proposed transaction (as discussed further below). Otherwise, the process continues with step 207, wherein the discount authorization processor 17 preferably assigns a unique tracking number to the proposed transaction.

In step 208, the discount authorization processor 17 determines if the transmitted membership number is appropriate by, for example, examining its check digit and, if so, the process continues with step 210. Otherwise the process enters to an error handling routine represented by step 310. In step 210, the discount authorization processor 17 performs a file look-up to correlate the membership number to its associated transaction card account. In steps 211 through 214, the discount authorization processor 17 preferably conducts validity checks to ensure that: (i) the transaction card account is valid; (ii) the status of the account is acceptable; (iii) whether there is a record of any historical problems associated with the account such as, for example whether any transactions have been denied in the past; and (iv) whether the request originated from a valid merchant 12. The authorized merchant 12 that issued the first authorization request 22 may be validated by, for example, comparing the identification of the merchant 12 contained in the request with a list of approved merchants stored in a database on the authorization processor 17. If any of these conditions is true, then the process flows to step 310 and the transaction is denied.

If the transaction is thus far approved, the process continues in steps 215 and 216, wherein the approval is preferably recorded by the authorization processor 17 and the approval is returned to the membership account issuing bank 16.

The process continues in step 401 (on FIG. 4), wherein the discount authorization processor 17 transmits a second authorization request 23 to the discount merchant bank 18 and enters a loop awaiting a response. At this point, the request (including the particular participant's transaction card account and the amount of the transaction) is forwarded to the transaction card issuing bank 20 associated with the transaction card account through the VISA® credit network (not shown on flow diagram). In step 402, the process will determine whether a response was received from the discount merchant bank 18, and, if not, the process will re-try the request up to a certain number of times (for example, three). Thus, step 404, the process increments a counter and, provided the counter is less than the desired maximum number of retry attempts, the process (in step 406) will delay for a certain period of time (for example, 15 seconds), and then resend the second authorization request 23 from the authorization processor 17 to the merchant bank 18. If the process has reached its maximum number of retry attempts (as determined in step 405), the process enters its error handling routine in step 407 (as discussed below).

Once the transaction card issuer 20 issues an authorization response signal 24, such response signal 24 is received by and routed through the merchant bank 18, to the discount authorization processor 17 (as determined by step 402). If the response signal 24 indicates a positive response to the proposed transaction, the authorization processor 17 stores the transaction card account information and control passes back to step 217 (on FIG. 2). At that point, in steps 217 and 218, the authorization response signal 24 is forwarded as a second authorization response signal 25 to the authorized merchant 12 through the discount transaction system 10, the merchant 12 preferably logs the authorization number for later settlement (step 219) and the process continues with step 301. Preferably, at this point, the discount authorization processor 17 stores certain information related to the transaction, including the membership number, the identity of the merchant, the transaction amount, the transaction date and the authorization numbers.

In step 301 (FIG. 3) the merchant 12 accepts the order and, provided the merchant 12 has not received any information indicating the transaction should be denied, ships the order to the customer (step 309). At this point the order placement and acceptance portion of the discount transaction system are complete.

If the merchant 12 receives information indicating the transaction should be (or should have been) denied, such as, for example, the receipt of an alert from the discount authorization processor 17 received via a fax machine (step 302), and the merchant 12 has yet to ship the items (step 303), the merchant 12 may preferably cancel the order (step 307), inform the administrator of the discount credit network (step 308) and inform the potential customer of the denial (step 315). If the merchant 12 has already shipped the items prior to receiving the denial information (as determined in step 303), in step 304, the merchant 12 may inform the administrator of the discount credit network, who will thereafter coordinate a resolution of the problem with the customer and participant (step 305).

Whenever the process enters step 310 (representing an error condition resulting from, for example, a problem with the validity or status of the discount account number or if the request originated from an unapproved merchant), the discount authorization processor 17 transfers a denial through the discount credit system 10, which is preferably received and logged by the merchant 12 (steps 311 through 314). Then, in step 315, the merchant 12 informs the customer of the denial.

In step 407, the process enters an error handling routine resulting from the failure to receive a timely response from the discount merchant bank 18, wherein the process retrieves the contact information for the particular merchant 12 who initiated the transaction. If appropriate contact information is located, the process attempts to notify the merchant 12 (as depicted in steps 501 through 507). Preferably, for purposes of this embodiment, the authorization processor 17 attempts to contact the merchant 12 by both facsimile transmission and by depositing a voice-mail message. Preferably, the authorization processor 17 records the results of its attempts to contact the merchant 12. The authorization processor 17 preferably logs the problem event in step 508 and sets a parameter indicating the at there exists a problem with this particular discount membership number (step 509).

Figure 6:
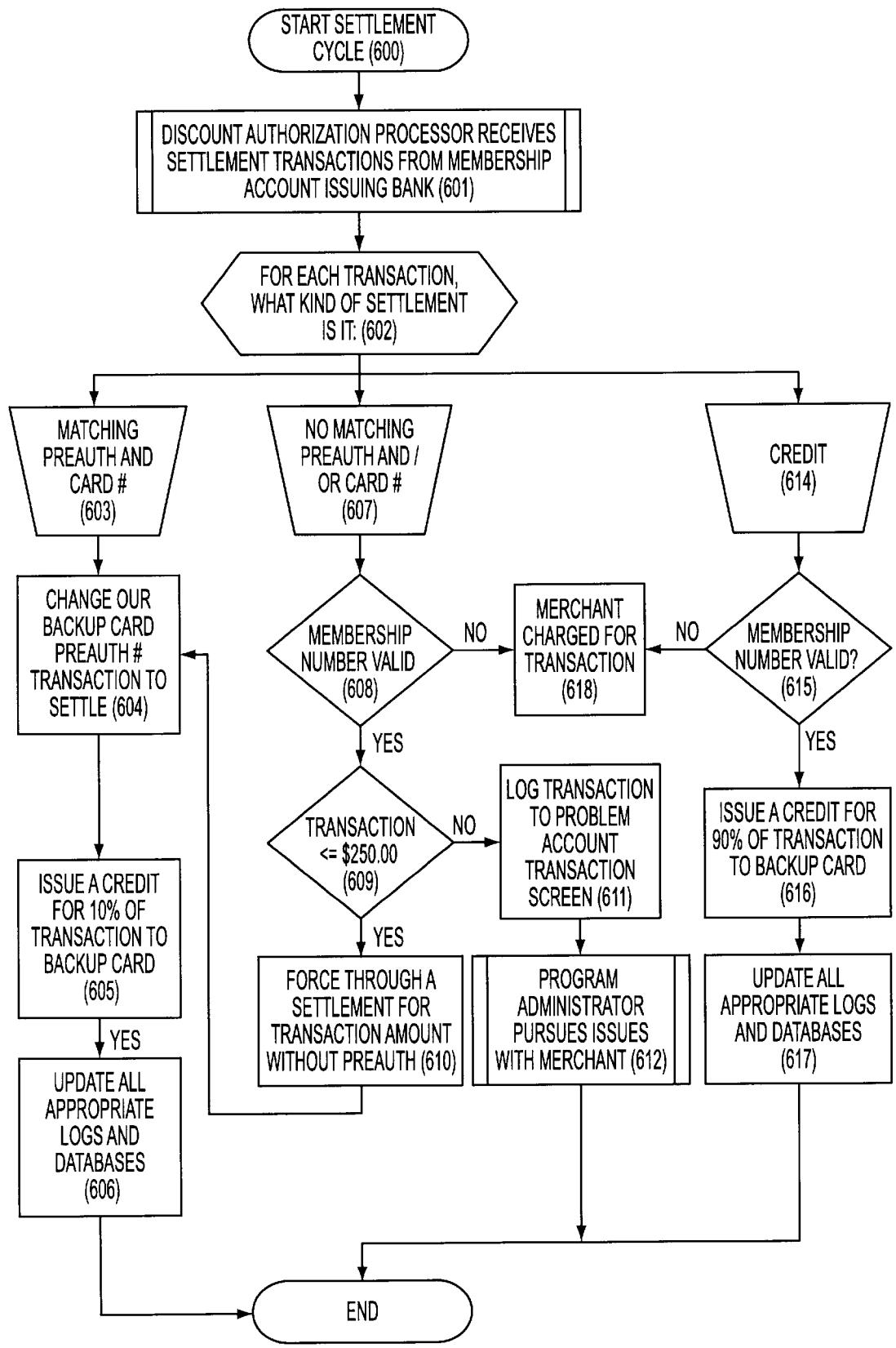
FIG. 6 shows a representative process for settling transactions processed through the discount credit system of the present invention.

Turning now to FIG. 6, therein illustrated is a representative settlement cycle 600 for the discount credit system 10 of the present invention. In step 601, the discount authorization processor 17 receives settlement transaction information from the discount account issuing bank 16 and preferably, processes such information based on its type as determined in step 602: (i) the pre-authorization and membership numbers match those stored in a database on the discount authorization processor 17; (ii) either the pre-authorization and/or membership numbers do not match those recorded in the database on the authorization processor 17; or (iii) a credit request.

If step 602 determines that the transaction has a matching pre-authorization and membership number, the process flows through steps 603–606 to change the transaction card account pre-authorization number transaction to settled, to issue a credit for a certain discount percentage on the transaction card account associated with the particular transaction, and to update all appropriate logs and databases.

If in step 602 it is determined that there is no matching pre-authorization and/or membership number, the process continues through step 607 to step 608 where a logic check is made to determine if the membership number is valid. If the settlement request indicates that it is related to a valid membership number, and the value of the transaction was less than a certain limit (step 609), the process forces through a settlement for the amount of the transaction without pre-authorization (step 610) and the process continues with steps 605 and 606 to issue the proper credit, representing the discount percentage, on the participant's transaction card account and to update all appropriate logs and databases.

If, as determined in step 609, the value of the transaction is greater than the pre-established limit, the process proceeds to step 611, wherein a settlement problem is logged and the administrator of the discount credit system preferably coordinates with the appropriate merchant 12 to resolve the discrepancy (step 612). If, as determined by step 608, the membership number transmitted with the settlement request is invalid, then the process proceeds with step 618 wherein the merchant is charged for the amount of the transaction.

If the current settlement transaction is a credit, the process flows through steps 614 and 615 to determine if the membership number associated with the settlement request is valid. If the membership number is valid then, in steps 616 and 617, the value of the transaction minus the previously applied discount is credited to the participants appropriate transaction card account through the conventional VISA® credit network. Additionally, all appropriate logs and databases are updated. If the membership number is invalid as determined in step 615, then, preferably, the transaction is settled, less an appropriate discount for the handling fee. If, as determined by step 615, the membership number transmitted with the settlement request is invalid, then the process proceeds with step 618 wherein the merchant is charged for the amount of the transaction.

Figure 7:
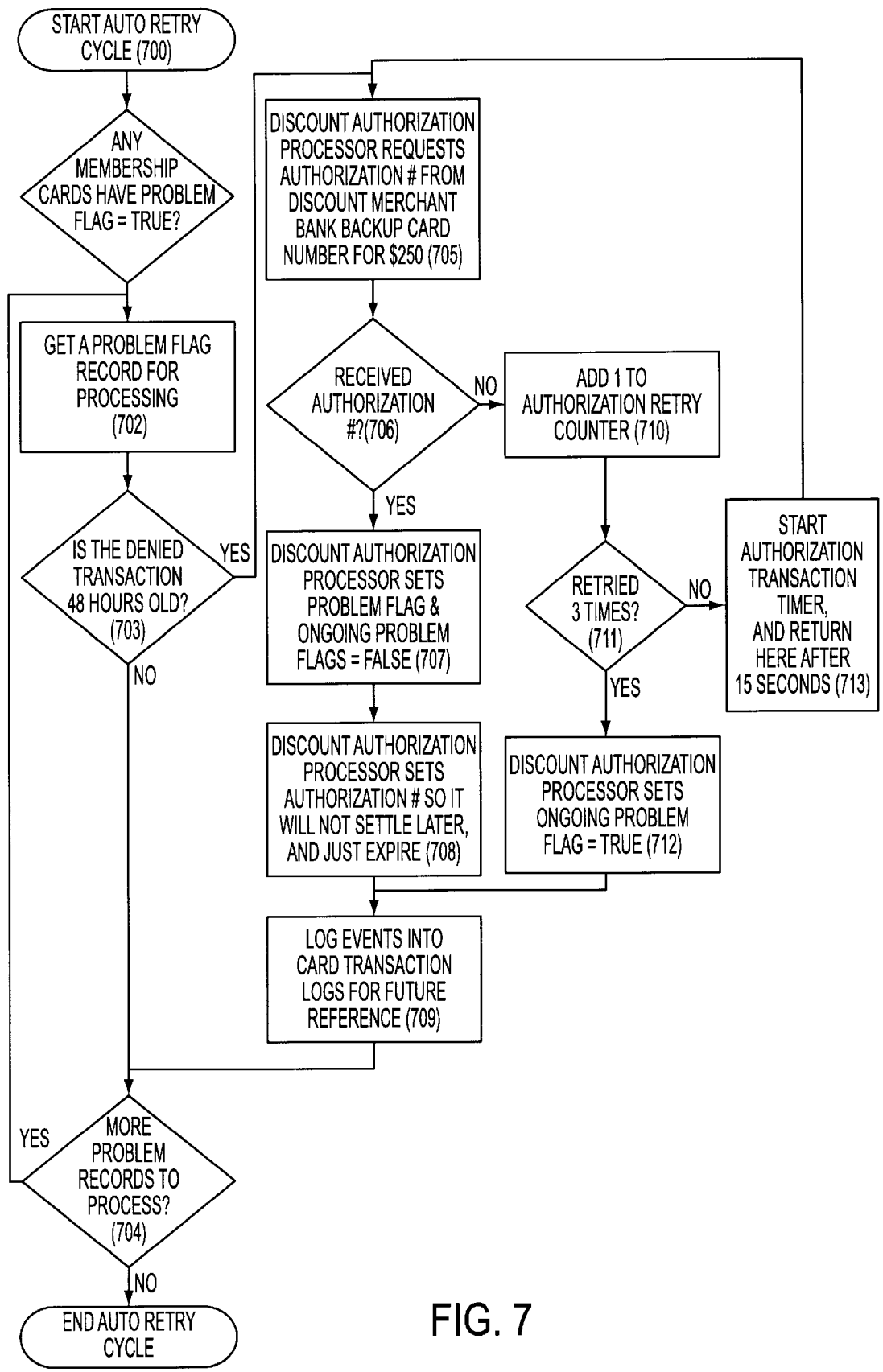
FIG. 7 shows a representative automatic retry process in accordance with the presently preferred method of the present invention.

Turning now to FIG. 7, therein is illustrated a representative automatic retry cycle for the present invention. The purpose of the automatic retry cycle is to re-request approval for all transactions which were denied authorization. Preferably, after waiting a certain period of time, a synthetic transaction request is issued, using the membership number of the denied transaction. Thus, the process attempts to receive approval for the synthetic transaction and, if approval is received, the particular record in the system database showing problem transaction recorded against that particular membership account is cleared.

A preferred automatic retry process starts in step 701 wherein the process determines if there are any denied transactions recorded in the system database and, if there are, a particular record is retrieved in step 702. In step 703, the process determines if the denied transaction is at least 48 hours old and, if yes, proceeds to step 705 wherein the discount authorization processor 17 re-requests authorization for the particular denied transaction membership number using a nominal transaction value. If authorization is received through the discount merchant bank 18, in step 707 the entry in the database corresponding to the problem transaction is cleared, the discount authorization processor 17 sets the authorization number such that the system will not attempt to later settle the synthetic transaction and logs the events into the database corresponding to the particular membership account (steps 708 and 709).

If, in step 706, authorization for the synthetic transaction is not received from the discount merchant bank 18, the system will repeat the request up to three times (steps 710, 711 and 713). If no authorization is received after three attempts (or any other number that may preferably be selected), the process records the failed attempt in the database corresponding to that particular membership number (step 709) and proceeds to step 704 to attempt to receive authorization for the next membership account for which a problem was recorded.

The foregoing discussion of FIGS. 2 through 7 merely illustrates the principles of the invention and it will be appreciated that those skilled in the art will be able to devise numerous arrangements which, although not explicitly shown or described herein, embody the principles of the present invention and are within the spirit and scope of the invention.

The present invention also preferably provides a method to account for a lost or stolen membership number or its associated transaction card. Preferably, the present invention provides two methods to be followed by the participant to insure that in such a situation, non-authorized purchases are not made through the discount credit system. Preferably, if a participant's membership number or its associated transaction card is either lost or stolen, the participant will have five options: (i) cancel their discount credit system membership; (ii) obtain a new discount membership number associated with the previous transaction card account; (iii) associate their membership number with a new transaction card account; (iv) obtain a new membership number associated with a new transaction card account; or (v) update the expiration date on their transaction card account.

Preferably, the first method for a participant to use upon losing his/her membership number or associated transaction card account number is to contact, preferably via telephone, and "re-register" with the discount credit system administrator. Thus, in this manner the participant will not lose access to the discount program. Alternatively, the participant may contact his associated client and the client may use a data terminal, such as a ZON® terminal to update the database stored within the discount authorization processor 17.

The present invention provides a system and method for providing a discount credit system utilizing an existing credit authorization network. The preferred system provides benefits to: (i) participants, by allowing such participants to receive merchandise and services at a discount; (ii) merchants, by allowing them to acquire new customers having a qualified credit base; and (iii) card issuers, by increasing the usage of transaction cards. The preferred system provides such benefits through a unique method whereby neither the participants, the authorized merchants, nor the card issuers exert any effort beyond that normally used in conventional transaction card procedures.

Although the present invention has been described in considerable detail with reference to certain presently preferred versions thereof, other versions are possible without departing from the spirit and scope of the present invention. Therefore the appended claims should not be limited to the description of the preferred versions contained herein.

We claim:

1. A method for providing a discount for a credit transaction, for use in a discount credit network comprising a plurality of transaction card issuers each having a plurality of participants holding a transaction card account issued by the card issuer, the method comprising the steps of:

(a) assigning each participant a membership number wherein the membership number is associated with the particular participant's transaction card account;

(b) providing a computerized discount authorization processor operatively connected to the discount credit network comprising: (i) a database containing the membership numbers and their associated transaction card accounts; and (ii) processing means for correlating the membership numbers to their associated transaction card accounts and transaction card issuers;

(c) presenting, by the participant, the membership number to an authorized merchant for a transaction;

(d) issuing a first discount authorization request from said authorized merchant through the discount credit network to the discount authorization processor, wherein the first discount authorization request includes transaction data comprising the particular participant's membership number and an amount for the transaction;

(e) correlating the membership number to its associated transaction card account and transaction card issuer;

(f) issuing a second discount authorization request to the transaction card issuer associated with the transaction card account through the credit network, the second discount authorization request comprising the particular participant's transaction card account and the amount of the transaction;

(g) receiving, by the discount authorization processor, an authorization response signal from the transaction card issuer, said signal indicating a response to the proposed transaction; and (h) forwarding the authorization response signal to the authorized merchant.

2. The method of claim 1 further comprising the step of applying the discount to the transaction whereby the participant receives a discount for initiating the transaction through the discount credit network.

3. The method of claim 1 wherein step (d) further comprises issuing a first discount authorization request from said authorized merchant to a merchant bank wherein the first discount authorization request includes transaction data comprising the particular participant's membership number and an amount for the transaction and routing said first discount authorization request through the discount credit network from the merchant bank to the discount authorization processor.

4. The method of claim 1 wherein the membership number comprises a bank identification number assigned by a VISA® credit card system, thereby allowing the method to utilize a VISA® credit transaction network.

5. The method of claim 1 further comprising the step of verifying that the discount authorization request originated with an authorized merchant.

6. The method of claim 1 further comprising the step of verifying that the membership number associated with the particular participant is in good standing.

7. The method of claim 1 further comprising the step of periodically generating a consolidated statement of the transactions utilizing a particular membership number during the period, wherein the statement shows the discount applied to each such transaction.

8. The method of claim 1, wherein the discount authorization processor includes database means for storing authorization parameters, the authorization parameters comprising a transaction limit amount whereby only transactions falling below the limit will be authorized and a database of historical transaction information related to each membership number, and wherein the authorization response signal received from the transaction card issuer indicates that the transaction card issuer has not approved the transaction, the method further comprising the step of:

generating an authorization response signal within the discount authorization processor, wherein the response signal is based on the authorization parameters.

9. The method of claim 1, wherein step (a) comprises the step of actively receiving a request for a membership number from a participant, wherein the membership number is associated with the particular participant's transaction card account.

10. The method of claim 1 further comprising the steps of:

(a) recording information related to each transaction, the information comprising the membership number, the transaction card account, and the amount of the transaction;

(b) issuing a credit transaction through the discount credit network to post the discount to the participant's transaction card account; and (c) issuing a payment request to the card issuer for the amount of the transaction through the discount credit network.

11. The method of claim 10 further comprising the step of invoicing the authorized merchant for a commission for participating in the discount credit transaction.

12. A system for providing a discount to a credit transaction comprising:

(a) a database comprising a plurality of membership numbers assigned to a plurality of participants, wherein each membership number is associated with a transaction card account and wherein each membership number comprises a bank identification number assigned by a VISA® credit card system, thereby allowing the membership number to be processed by a VISA® credit transaction network;

(b) an authorized merchant having means for generating a discount authorization request, the discount authorization request comprising a particular membership number and an amount for the credit transaction; and (c) a computerized discount authorization processor operatively connected to receive the discount authorization requests, the discount authorization processor comprising: (i) logic means for correlating the membership number to its associated transaction card account; (ii) means for generating a transaction request to one of a plurality of transaction card issuers associated with the transaction card account, the transaction request comprising the particular participant's transaction card account and the amount of the transaction; (iii) means for receiving an authorization response signal from the transaction card issuer, said response signal indicating a response to the proposed transaction; and (iv) means for applying the discount to the transaction whereby the participant receives a discount for initiating the transaction.

13. The system of claim 12 wherein the discount authorization processor further comprising means for verifying that the discount authorization request originated with an authorized merchant.

14. The system of claim 12 wherein the discount authorization processor further comprises means for verifying that the membership number associated with the particular participant is in good standing.

15. The system of claim 12 wherein the discount authorization processor further comprises means for periodically generating a consolidated statement of the transactions utilizing the membership number during the period, wherein the statement shows a discount applied to each such transaction.

16. The method of claim 1, wherein the discount authorization processor includes database means for storing authorization parameters, the authorization parameters comprising a transaction limit amount whereby only transactions falling below the limit will be authorized and a database of historical transaction information related to each discount account number, and wherein the authorization response signal received from the transaction card issuer indicates that the transaction card issuer has not approved the transaction, the discount authorization processor further comprising means for generating an authorization response signal based on the authorization parameters.

17. The system of claim 12 further comprising means for actively receiving a request for a membership number from a participant, wherein the membership number is associated with the particular participant's transaction card account.

18. The system of claim 12 further comprising:

(a) means for recording information related to each transaction, the information comprising the membership number, the transaction card account, and the amount of the transaction;

(b) means for issuing a credit transaction through the discount credit network to post the discount to the participant's transaction card account; and (c) means for issuing a payment request to the card issuer for the amount of the transaction through the discount credit network.

* * * * *